Patented July 27, 1948

2,446,008

UNITED STATES PATENT OFFICE 2,446,008

PREPARATION OF ORGANOBORON COMPOUNDS

Dallas T. Hurd, Schenectady, N. Y., assignor to General Electric Company, a corporation of New York No Drawing. Application October 25, 1945, Serial No. 624,599

13 Claims. (Cl. 260—607)

This invention relates to a new and improved method for the preparation of organoboron compounds. More particularly the invention is concerned with the method of preparing alkylated (e. g., methylated, ethylated, propylated, butylated, amylated, etc.) boron compounds which comprises effecting reaction between a boron halide, specifically boron chloride, bromide, fluoride or iodide, and an alkyl halide corresponding to the desired alkylated boron compound, e. g., a methyl, ethyl, propyl, butyl, amyl, etc., halide (chloride, bromide, fluoride or iodide). The scope of the invention also includes the method of preparing an alkylated boron compound which comprises effecting reaction between a boron halide and an alkyl halide by causing the mixed vapors thereof to contact at reaction temperature a metal effective in reducing the boron halide, e. g., aluminum, zinc, etc.

One of the methods heretofore known for producing alkylated borons (boron alkyls) comprised effecting reaction between a boron ester, e. g., ethyl borate (triethoxy boron), or a boron halide and a metal alkyl such as zinc dimethyl in ether solution. Another method involved the reaction between a boron ester or halide and a Grignard reagent, e. g., ethyl magnesium bromide, in ether solution. These methods are described by E. Krause and A. von Grosse in the book, "Die Chemie der Metall-Organischen Verbindungen," Berlin (1937).

My method of preparing alkylated boron compounds as described briefly in the first paragraph of this specification and more fully hereafter has several advantages over the methods heretofore known. For example, it makes possible the production of boron alkyls with less hazard, in relatively simple equipment (especially if the reaction is carried out in the vapor phase as is preferred) and at lower cost than the prior methods. This is because the method of my invention obviates the use of ether or other solvents, eliminates the necessity of employing hazardous reactants such as zinc dimethyl, and yields the desired products more economically than previously was possible. The method also results in the production of valuable by-products, e. g., aluminum halides, zinc halides, etc., depending upon the particular metal employed.

The primary reaction products of the method of my invention are boron alkyls, but the reaction products also may include alkylhalogenoboranes (monoalkyldihalogenoboranes and monohalogenodialkylboranes), e. g., monomethyldichloroborane, monochlorodimethylborane, monoethyldibromoborane, monobromodiethylborane, etc.

In order that those skilled in the art better may understand how the present invention may be carried into effect, the following examples are given by way of illustration and not by way of limitation.

Example 1

A continuous stream of the mixed vapors of boron bromide (boron tribromide) and methyl chloride in a volume ratio of about 1:2 was passed through a bed of 20-mesh aluminum granules heated to about 350° C. A reaction ensued with the formation of aluminum halides, and the volatile reaction product was condensed at −80° C. A fraction comprising boron methyl (boron trimethyl), $B(CH_3)_3$, was separated from this condensate by distillation. It was identified by its volatility (boiling point −20° C.), its characteristic pungent odor and its spontaneous inflammability upon coming into contact with air. The condensate also may have included methylbromoboranes (methyl boron bromides), since such compounds probably are formed as intermediates during the reaction.

Example 2

Same as Example 1 with the exception that gaseous boron fluoride (boron trifluoride) was used in place of boron bromide vapor. As in Example 1, the primary reaction product of this example also comprised a methylated boron, more particularly trimethyl boron.

Example 3

A continuous stream of the mixed vapors of boron chloride (boron trichloride) and methyl chloride in about 1:2 ratio by volume was passed over finely divided zinc (about 80-mesh particle size) heated to a temperature of about 325° to 350° C. Zinc chloride was formed, together with a volatile reaction product which was condensed at −80° C. Boron methyl was obtained upon distillation of the condensate, which also may have included methylchloroboranes (methyl boron chlorides).

Example 4

The mixed vapors of boron chloride and ethyl chloride in about 1:3 ratio by volume were passed in a continuous stream over granular aluminum heated to about 325° C. The vapors were condensed, yielding a condensate comprising ethylated boron compounds less volatile than the starting reactants and separable therefrom by distillation of the condensate, the ethylated boron compounds, specifically triethyl boron, constituting the residue. Aluminum chloride was obtained as a by-product of the reaction. Boron ethyl (boron triethyl), like boron methyl, is instantly inflammable upon coming in contact with the air.

It will be understood, of course, by those skilled in the art that my invention is not limited to the specific boron halides and alkyl halides named in the above illustrative examples. Thus, boron iodide also may be employed, and alkyl halides other than the methyl and ethyl chlorides used in the examples. Examples of other alkyl halides that may be employed in forming the corresponding alkylated boron compounds, more particularly boron alkyls, in addition to those mentioned in the first paragraph of this specification, are: n-propyl iodide, n-butyl bromide, n-amyl chloride, mixed (normal and isomeric) amyl chlorides, isopropyl fluoride, tert-butyl chloride, isopropyl bromide, isoamyl chloride, etc. If desired, mixtures of boron halides with a single or with a plurality of alkyl halides may be used; or a single boron halide may be employed with a mixture of different alkyl halides.

Likewise, the invention is not intended to be limited to the specific metals, aluminum and zinc, mentioned in the foregoing examples, since any metal effective in reducing the boron halide reactant, that is, in rupturing a boron-halogen bond, may be employed.

It also will be understood that the invention is not limited to the specific temperature or temperature ranges mentioned in the examples. However, it is desirable that the reaction temperature should not be so high as to cause decomposition of the alkylated boron compounds, more particularly boron alkyls, as they are formed, to a substantial extent or the deposition of excessive amounts of metallic boron upon the contact metal or elsewhere within the reaction zone. The reaction temperature will vary depending, for instance, upon the particular boron halide, alkyl halide and reactive metal employed, but ordinarily will be within the range of about 250° to about 400° C., more particularly about 300° to 375° C.

In general, the vapor-phase reactions are preferred because they can be carried out more economically and controlled more easily. It will be understood, of course, by those skilled in the art that the expression "vapors of a boron halide" as used generally herein and in the appended claims includes within its meaning gaseous boron fluoride.

The proportions of boron halide and alkyl halide to each other may be varied considerably, as desired or as conditions may require. The boron halide and alkyl halide may be used in approximately stoichiometric amounts if desired. Ordinarily, however, an excess of alkyl halide is employed over the stoichiometric amount required for the reaction with the boron halide. Thus, the boron halide and alkyl halide may be employed in ratios by volume of the vapors ranging, for instance, from approximately equal volumes to 1 volume of boron halide per 10 volumes of alkyl halide.

From the foregoing description it will be seen that the present invention provides a new and valuable method of preparing methylated, ethylated and higher alkylated boron compounds by reaction between a boron halide and an alkyl halide, more particularly by bringing a mixture of the said halides (preferably the mixed vapors thereof) into contact with a metal effective in reducing the boron halide, e. g., aluminum, zinc, etc., which metal is maintained, as by heating, at reaction temperature. The invention also provides a method of converting a boron halide to a boron alkyl which comprises bringing a mixture (e. g., a vaporous mixture) containing an alkyl halide and the said boron halide into contact with a mass comprising aluminum, zinc or other metal effective in reducing the boron halide, the said mass being maintained at reaction temperature. Another method feature of the invention is the method of preparing a boron alkyl which comprises effecting reaction between a boron halide and an alkyl halide, e. g., at a temperature within the range of about 250° to about 400° C., while in contact with aluminum, zinc or other metal capable of reducing the boron halide reactant, and isolating or separating, as by distillation, the condensed boron alkyls from the other products of the reaction.

What I claim as new and desire to secure by Letters Patent of the United States is:

1. The method of preparing an alkylated boron compound which comprises bringing a mixture of a boron halide and an alkyl halide into contact with a metal selected from the group consisting of aluminum and zinc at an elevated temperature.

2. The method of preparing a methylated boron compound which comprises bringing a mixture of a boron halide and a methyl halide into contact with a metal selected from the group consisting of aluminum and zinc at an elevated temperature.

3. The method of preparing an ethylated boron compound which comprises bringing a mixture of a boron halide and an ethyl halide into contact with a metal selected from the group consisting of aluminum and zinc at an elevated temperature.

4. The method of preparing an alkylated boron compound which comprises bringing a mixture of a boron halide and an alkyl halide in the vapor phase into contact at an elevated temperature with a metal selected from the group consisting of aluminum and zinc.

5. The method of preparing an alkylated boron compound which comprises bringing the mixed vapors of a boron halide and an alkyl halide into contact with aluminum heated to an elevated temperature.

6. The method of preparing an alkylated boron compound which comprises bringing the mixed vapors of a boron halide and an alkyl halide into contact with zinc heated to an elevated temperature.

7. The method of preparing a methylated boron compound which comprises bringing a mixture of boron fluoride and methyl chloride into contact with aluminum at an elevated temperature.

8. The method of preparing a methylated boron compound which comprises bringing a mixture of boron chloride and methyl chloride into contact with zinc at an elevated temperature.

9. The method of preparing an ethylated boron compound which comprises bringing a mixture of boron chloride and ethyl chloride into contact with aluminum at an elevated temperature.

10. The method of converting a boron halide to a boron alkyl which comprises bringing a mixture containing an alkyl halide and the said boron halide into contact with a mass comprising aluminum, the said mass being maintained at an elevated temperature, 11. The method of converting a boron halide to a boron alkyl which comprises bringing a mixture containing an alkyl halide and the said boron halide into contact with a mass comprising zinc, the said mass being maintained at an elevated temperature.

12. The method of preparing a boron alkyl which comprises bringing a mixture of a boron halide and an alkyl halide into contact at an elevated temperature with a metal selected from the group consisting of aluminum and zinc, and isolating the boron alkyls that are formed.

13. The method of preparing a boron alkyl which comprises bringing a mixture of a boron halide and an alkyl halide into contact at a temperature within the range of about 250° to about 400° C. with a metal selected from the group consisting of aluminum and zinc, and separating the boron alkyls that are formed from the other products of the reaction.

DALLAS T. HURD.